United States Patent [19]

Hoover

[11] 4,198,439

[45] Apr. 15, 1980

[54] NUT CHEESE PRODUCT

[75] Inventor: Maurice W. Hoover, Raleigh, N.C.

[73] Assignee: Research Triangle Institute, Research Triangle Park, N.C.

[21] Appl. No.: 907,191

[22] Filed: May 18, 1978

[51] Int. Cl.$^2$ .............................................. A23L 1/36
[52] U.S. Cl. ..................................... 426/632; 426/582
[58] Field of Search ........................ 426/633, 582, 632

[56] References Cited

U.S. PATENT DOCUMENTS

| 2,511,119 | 6/1950 | Mitchell | 426/633 |
|---|---|---|---|
| 2,670,293 | 2/1954 | Stark | 426/633 |
| 2,911,303 | 11/1959 | Rowland et al. | 426/633 |
| 3,216,830 | 11/1965 | Melnick | 426/633 |
| 3,580,729 | 5/1971 | Darragh | 426/633 |

*Primary Examiner*—Jeanette M. Hunter
*Attorney, Agent, or Firm*—Cushman, Darby & Cushman

[57] ABSTRACT

A nut cheese product composed of a blend of ground roasted nuts, texture-modifying fat and dehydrated cheese said product having a water activity below about 0.70 and which is suitable as a spread for snacks and the like and which may be stored for extended periods of time without refrigeration.

16 Claims, 1 Drawing Figure

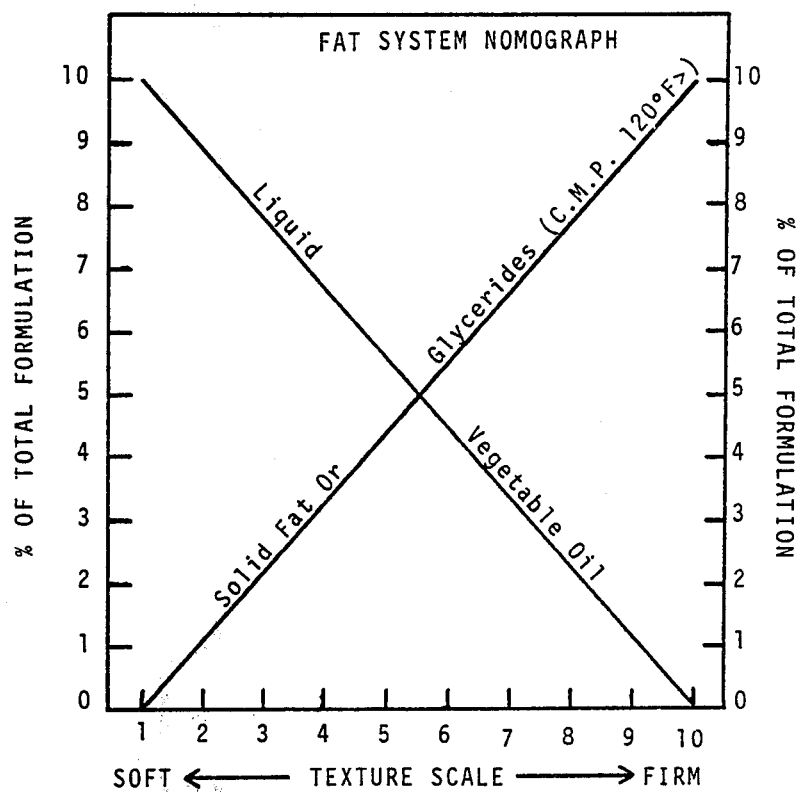
Fig. 1. Fat system nomograph for making peanut cheese to desired texture specifications.

NUT CHEESE PRODUCT

BACKGROUND OF THE INVENTION

This invention relates to a new and unique nut cheese food product and the process by which it is prepared.

Peanut butter is ordinarily composed of ground roasted peanuts, stabilizer, and optionally emulsifiers, sweeteners, salt, coloring and flavoring agents. Specialty type peanut foods have been developed including a sweetened peanut food product consisting essentially of peanuts and a non-intimate mixture of jam, jelly or marshmallow as described in U.S. Pat. No. 3,278,314. Another specialty type of peanut food is that consisting of a homogeneous blend of peanuts and sweetening agent such as honey as described in U.S. Pat. No. 3,995,068.

There is also a peanut cheddar cheese which is taught by U.S. Pat. No. 2,989,400.

Food spreads of various types are also known including simulated cheeses as disclosed for example in U.S. Pat. Nos. 3,310,406, 3,397,994 and 3,397,995. Each of these simulated cheese products requires refrigeration, as do products containing cheese. A method of producing shelf stable simulated meat pate; spreads or dips from dairy products is disclosed in U.S. Pat. No. 3,836,683.

It is an object of this invention to prepare a flavorful nutritious peanut cheese food product which has a long shelf life at room temperature and which can vary from a firm cheddar cheese like texture to a soft spreadable consistency. The product of the present invention therefore does have an advantage of being suitable for use in a number of different products including, for example, whole wedges or blocks, slices, sandwich spreads, balls, and even in pressurized or aerosol cans.

SUMMARY OF THE INVENTION

The present invention provides a new nut cheese product composed of a blend of ground roasted nuts and dehydrated cheese material, which may be stored in a wholesome condition at room temperatures for extended periods of time (e.g. at least eight to twelve months).

The product of the present invention has the good taste characteristics of both cheese and peanut better. The predominate flavor is cheese with a hint of peanut butter, but because nuts are the predominate constituent rather than the cheese and other dairy products, the cost of making the product is significantly less than that for a cheese or dairy product.

The nut cheese product of the present invention is comprised of ground roasted nuts, dehydrated cheese material and a texture modifying agent which comprises hydrogenated fats, non-hydrogenated fats, glycerides, or mixtures thereof. Preferably, the texture modifying agent comprises non-hydrogenated fats in combination with hydrogenated fat, glycerides or mixtures thereof. An emulsifier may be added to improve the product as may salt, flavorings and coloring agents in order to obtain any desired appearance and flavor.

The texture or consistency of the product is dependent upon both the amount and type of emulsifier employed, and more importantly, it is also dependent upon the ratio of non-hydrogenated to hydrogenated fats glycerides and mixtures thereof used as the texture modifying agent.

Shelf lifetime and stability without refrigeration is determined by the water activity or as it is also called, the minimum available water present in the food product. If the minimum available water is less than about 0.70, the product will have a long shelf life at room temperature.

As used herein, the term "water activity" of the nut cheese product is defined as the ratio of the vapor pressure of the product (Px) to that of pure water (Pw) under identical conditions. Thus, the water activity (Aw) may be expressed:

$$Aw = Px/Pw$$

as more fully explained in "Water and Food" by Samuel A. Matz, AVI Publishing Co. Inc., Westport, Conn., page 249, 1965, the contents of which are incorporated herein by reference.

As the water activity rating of the nut cheese product of the present invention is less than about 0.70, which is below the minimum available water values (Aw) necessary to sustain most all organisms, there is no need for refrigerated storage as the product does have a long shelf life at room temperature.

DETAILED DESCRIPTION OF THE INVENTION

The nut cheese product of the present invention is comprised generally of ground roasted nuts, dehydrated cheese material and a texture modifying agent selected from hydrogenated fats, non-hydrogenated fat, glycerides or mixtures thereof. An emulsifier, such as mono and diglycerides (exclusive of any present in the texture modifying agent) or lecithin may be added to stabilize the product. Salt, flavorings and color agents may be included to achieve any desired color and taste.

As used herein, "ground roasted nuts" is intended to refer to shelled roasted nuts such as peanuts, almonds, cashews, pecans and the like, but also to roasted seeds such as soybeans, sunflower seeds and the like. Preferably, the ground roasted nuts are peanuts. The ground roasted nuts may be prepared in a conventional manner by either dry roasting (e.g. 10 to 20 minutes at about 300°-375° F.) or cooking in oil at 300°-375° F. for about 3 to 6 minutes, the shelled nuts. The roasted nuts are then finely ground (preferably a creamy or butter-like consistency) in a conventional manner.

As used herein, the term "dehydrated cheese material" refers to cheese or cheese food having 10% or less by weight water. By "cheese food" is meant materials containing cheese powder together with buttermilk solids, flavors, lactic acid etc. Such cheese foods are often referred to as "processed cheese." A typical formulated cheese food powder for use according to the present invention includes by weight:

| | |
|---|---|
| Cheese powder (e.g. cheddar and blue) | 20.0% |
| Vegetable fat | 18.0% |
| Butter milk solids | 16.0% |
| Whey solids | 14.0% |
| Corn Syrup and/or dextrin solids | 14.0% |
| Salt | 5.0% |
| Citric acid | 4.0% |
| Lactic acid | 3.0% |
| Natural and artificial color | 2.0% |
| Disodium phosphate and/or sodium citrate | 2.0% |
| Natural and artificial flavors | 2.0% |
| | 100.0% |

Dehydrated cheddar cheese or a combination of dehydrated cheddar and blue cheese may be used rather than the cheese food powder shown above. Cost is the main consideration for substituting the cheese food powder for pure dehydrated cheese powder.

The texture or consistency of the food product depends not only upon the amount and type of emulsifier employed (if present), but also, and more importantly, on the ratio of non-hydrogenated to hydrogenated fats, glycerides or mixtures thereof used in the formulation of the texture modifying agent used in the product. The greater the ratio of non-hydrogenated fats to hydrogenated fats, glycerides and mixtures thereof in the product, the softer the product will be. FIG. 1 is a fat system nomograph that can be used in preparing a peanut cheese product to any desired texture. Thus, by referring to the diagram one can easily determine the required ratio of hydrogenated to non-hydrogenated fats for any desired texture specification.

The product can therefore vary from a firm cheddar cheese like texture to a soft spread depending upon the above factors. Thus, a firm nut cheese type product can be sliced and used similar to regular type cheese. The softer textured product can be used as a spread or made into a cheese like ball.

Since the water activity of this product is very low, there is no need for refrigerated storage. However, the product could be stored at refrigerated temperature if desirable without adversely affecting the product. If a firmer textured product is desired such as sliceable cheddar or American cheese, it can be accomplished simply by varying the ratio of non-hydrogenated to hydrogenated fat or glycerides and still not change the total fat content, flavor or water activity of the product, (FIG. 1). Mono and diglycerides that have a capillary melting point above about 120° F. may be substituted for the hydrogenated fat in the system if it is desirable to do so.

The nut cheese product may contain from 5 to 15 precent by weight of the texture modifying agent. Preferably the nut cheese product contains about 10 percent by weight of the texture modifying agent which comprises non-hydrogenated fats in combination with hydrogenated fats, glycerides or mixtures thereof in a weight ratio (hydrogenated fats/non-hydrogenated fats, etc.) of from about 1:10 to 10 to 1.

A variety of fats may be used, but preferably vegetable oil is employed (e.g. peanut, sesame, soybean, Crisco, corn, coconut and the like). Peanut oil is preferred as a non-hydrogenated fat.

As noted, emulsifiers, if desired, may be incorporated into the product. As glycerides may be employed as emulsifiers, it is to be understood that when so incorporated, the amount is in addition to whatever may be present in the texture modifying agent. The emulsifier may be present in an amount up to about 5 percent by weight of the composition.

In general, the nut cheese product has a water activity below about 0.70, can be maintained in a wholesome condition for extended periods of time and comprises by weight:

(a) 50 to 80 percent ground roasted nuts;
(b) 10 to 40 percent dehydrated cheese material;
(c) 5 to 15 percent of a texture modifying agent which comprises non-hydrogenated fat in combination with hydrogenated fats, glycerides and mixtures thereof, said texture modifying agent having a capillary melting point above 120° F.

(d) 0.5 to 2.0 percent salt.

The general ingredients for the nut cheese product is set forth in Table I below:

TABLE 1

| Ingredients | Typical % | Range % |
| --- | --- | --- |
| Ground roasted nuts | 64.60 | 50–80 |
| Dehydrated cheese or cheese food | 24.00 | 10–40 |
| Texture Modifying Agent | 10.00 | 5–15 |
| Salt | 0.75 | 0.5–2.0 |
| Emulsifier* | 0.40 | 0–5.0 |
| Artificial color (annatto and paprika oil)* | 0.25 | 0–1.0 |

*Improves product but in some instances it is not absolutely necessary

The nut cheese product can be prepared by using standard equipment found in any peanut butter or dairy product plant.

A predetermined amount of non-hydrogenated fat, preferably a vegetable oil, is heated in a vessel. A suitable piece of equipment for this purpose, and which is available in any peanut butter or dairy plant, is a steam jacketed stainless steel kettle heated with steam or hot water. A predetermined amount of hydrogenated fat, preferably with a capillary melting point above about 120° F., or glyceride, preferably with a capillary melting point above about 120° F., or a mixture thereof is added to the non-hydrogenated fat. The admixture is stirred and heated until the hydrogenated fats or glycerides are melted. The total amount of fats or glycerides or a mixture thereof can range from about 5% to about 15% by weight of the final nut cheese product, but preferably is about 10%.

Ground roasted nuts are then added to the hot oil mixture which is still being heated and stirred. The amount of ground roasted nuts employed is preferably in the range of about 50% to about 80% by weight of the final nut cheese product. The oil-fat-peanut mixture is then heated to a temperature above about 140° F. with continual stirring until said mixture has a smooth consistency.

If desired, an emulsifier, preferably lecithin, is then added to the oil-fat-peanut mixture along with salt, flavorings and oil soluble coloring agents. The oil soluble coloring agents can, if desired, be added to the non-hydrogenated oil at the beginning of the process. The amount of emulsifier other than glycerides should preferably be no greater than 5.0% by weight of the final nut cheese.

The amounts of salt, flavorings and coloring agents is dependent upon the color and taste desired for the final nut cheese product.

The resultant mixture is then heated to a temperature above about 140° F. and is blended to a smooth consistency. A dehydrated cheese or cheese food powder in an amount preferably ranging from about 10% to about 40% by weight of the final nut cheese product is then added to said mixture and the resultant admixture which is the desired peanut cheese food is blended to a smooth homogeneous consistency while the temperature is maintained above about 140° F.

The peanut cheese food is then packaged while at a temperature sufficiently high that the product may be poured or pumped into the container or package in which it is to be stored (e.g. ranging from about 110° F. to about 160° F.). Preferably, the peanut cheese food is removed from the vessel and ground through a colloid mill or homogenizer prior to packaging in order to achieve a more homogeneous product.

Thus, the present invention further embodies a process for preparing a nut cheese product of the type hereinbefore described which comprises the steps of:
(a) heating the non-hydrogenated fat and adding thereto hydrogenated fat, glyceride or mixtures thereof;
(b) heating the mixture of step (a) until said hydrogenated fat, glyceride or mixtures thereof is melted;
(c) adding ground roasted nuts to the heated mixture of step (b) and thereafter heating the resulting mixture to a temperature of at least 140° F. (e.g. 140° to 200° F.) while blending to form a smooth consistent homogeneous product;
(d) adding dehydrated cheese material to the homogeneous product of step (c) and continue blending to a smooth consistency; and
(e) packaging the product of step (d) at a temperature whereby the product may be poured or pumped into the package.

If desired, between steps (d) and (e) the product of step (d) can be ground through a colloid mill or homogenizer.

The following example is offered to more fully illustrate the invention, but is not to be construed as limiting the scope thereof.

EXAMPLE

A twenty pound batch of a nut cheese food product to be used as a spread was made as follows:

1.3 Pounds (6.5% by weight) of peanut oil were placed in a heated steam jacketed stainless steel tank along with 0.7 pounds (3.5% by weight) of hydrogenated vegetable oil that had a capillary melting point above about 120° F. These fats were heated to about 150° F. by atmospheric pressure steam while being stirred. After the hydrogenated fat had melted, 14.12 pounds (70.6% by weight of ground roasted peanuts were added and blended into the mixture along with 0.025 pounds (0.125% by weight) of annato for color, 0.025 pounds (0.125% by weight) of paprika oil for color, 0.15 pounds (0.75% by weight) salt, and 0.08 pounds (0.04% by weight) lecithin. 3.6 pounds (18% by weight) of dehydrated cheddar cheese powder was added and blended into the other ingredients. The peanut cheese product was then heated to about 150° F. The peanut cheese product was then passed as a fluid through a colloid mill, packaged and allowed to cool.

The invention in its broader aspects is not limited to the specific details shown and described, but departures may be made from such details within the scope of the accompanying claims without departing from the principles of the invention.

The invention may furthermore comprise, consist or consist essentially of the hereinbefore recited materials and steps.

What is claimed is:

1. A nut cheese product comprising a homogeneous blend of by weight 50 to 80 percent ground roasted nuts, 10 to 40 percent dehydrated cheese material and 5 to 15 percent of a texture modifying agent which comprises hydrogenated fats, non-hydrogenated fats, glycerides and mixtures thereof, said product having a water activity below about 0.70 and capable of being maintained in a wholesome condition for extended periods of time without refrigeration.

2. The product of claim 1 wherein the amount of said texture modifying agent is up to about 10% by weight of the final nut cheese product.

3. The product of claim 2 wherein the texture modifying agent has a capillary melting point above about 120° F.

4. The product of claim 3 further including an emulsifier.

5. The product of claim 4 further including oil soluble coloring and salt.

6. A nut cheese product having a water activity below about 0.70 and capable of being maintained in a wholesome condition for extended periods of time without refrigeration comprising by weight a honogeneous blend of:
(a) 50 to 80 percent ground roasted nuts;
(b) 10 to 40 percent dehydrated cheese material;
(c) 5 to 15 percent of a texture modifying agent which comprises non-hydrogenated fat in combination with hydrogenated fats, glycerides and mixtures thereof, said texture modifying agent having a capillary melting point above about 120° F.
(d) 0.5 to 2.0 percent salt.

7. The product of claim 6 further comprising up to about 5 percent of an emulsifier and up to about 1.0 percent artificial color.

8. The product of claims 1 or 6 wherein said ground roasted nuts are selected from the group consisting of peanuts, almonds, cashews, soybeans, sunflower seeds and mixtures thereof.

9. The product of claims 1 or 6 wherein said dehydrated cheese material is dehydrated cheese.

10. The product of claims 1 or 6 wherein said dehydrated cheese material is a dehydrated cheese food.

11. The product of claims 1 or 6 wherein the texture modifying agent is present in an amount of about 10 percent and the weight ratio of said non-hydrogenated fats to hydrogenated fats, glycerides or mixtures thereof ranges from about 1:10 to 10:1.

12. A process for preparing the nut cheese product according to claim 1 which comprises the steps of:
(a) heating said non-hydrogenated fat and adding thereto hydrogenated fat, glyceride or mixtures thereof;
(b) heating the mixture of step (a) until said hydrogenated fat, glyceride or mixtures thereof is melted;
(c) adding ground roasted nuts to the heated mixture of step (b) and thereafter heating the resulting mixture to a temperature of at least 140° F. while blending to form a smooth consistent homogeneous product;
(d) adding dehydrated cheese material to the homogeneous product of step (c) and continue blending to a smooth consistency; and
(e) packaging the product of step (d) at a temperature whereby the product may be poured or pumped into the package.

13. The process of claim 12 wherein step (c) is carried out at a temperature between about 140° and 200° F.

14. The process of claim 12 wherein as an intermediate step between steps (d) and (e), the step which comprises grinding of the product of step (d) through a colloid mill or a homogenizer.

15. The process of claim 12 wherein oil soluble coloring and salt are added to the product prior to step (e).

16. The process of claim 12 wherein flavorings are added to the product prior to step (e).

* * * * *